April 13, 1954     F. LONG     2,674,795
HEDGE TRIMMER
Filed March 31, 1950     2 Sheets-Sheet 1
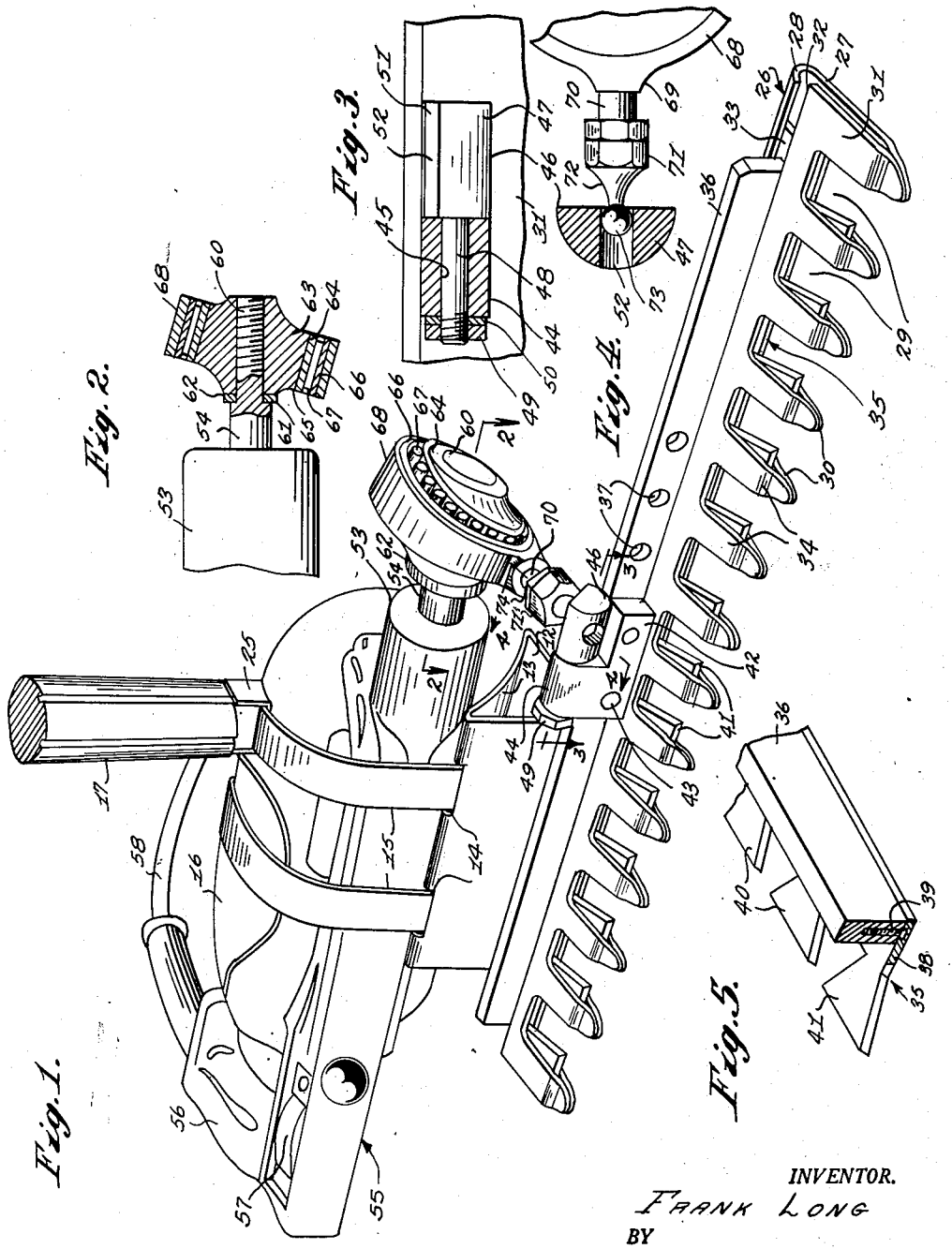
INVENTOR.
FRANK LONG
BY
McMorrow, Berman & Davidson
ATTORNEYS INVENTOR.
FRANK LONG
BY
McMorrow, Berman + Davidson
ATTORNEYS Patented Apr. 13, 1954

2,674,795

UNITED STATES PATENT OFFICE 2,674,795

HEDGE TRIMMER

Frank Long, Detroit, Mich.

Application March 31, 1950, Serial No. 153,171

2 Claims. (Cl. 30—216)

This invention relates to hedge trimmers and more particularly to a power operated hedge trimmer driven by a suitable source of power, such as an electric motor or a flexible drive shaft.

It is among the objects of the invention to provide a readily portable hedge trimmer which can be easily held in the hands during use and is attachable to a power source, such as an electric drill motor or a flexible drive shaft, for application of operating power thereto, which has an antifriction blade drive easily assemblable and disassemblable from a driven shaft constituting a component of the power source, and which is simple and durable in construction, economical to manufacture, and easy to use.

Other objects and advantages will become apparent from a consideration of the following description and the appended claims in conjunction with the accompanying drawings wherein:

Figure 1 is a perspective view of a hedge trimmer assembly illustrative of the invention;

Figure 2 is a cross sectional view of a fragmentary portion of the assembly taken on the line 2—2 of Figure 1;

Figure 3 is a cross sectional view of a fragmentary portion of the assembly taken on the line 3—3 of Figure 1;

Figure 4 is a cross sectional view of a fragmentary portion of the assembly taken on the line 4—4 of Figure 1;

Figure 5 is a perspective view of a fragmentary portion of the blade component of the device.

Figure 6:
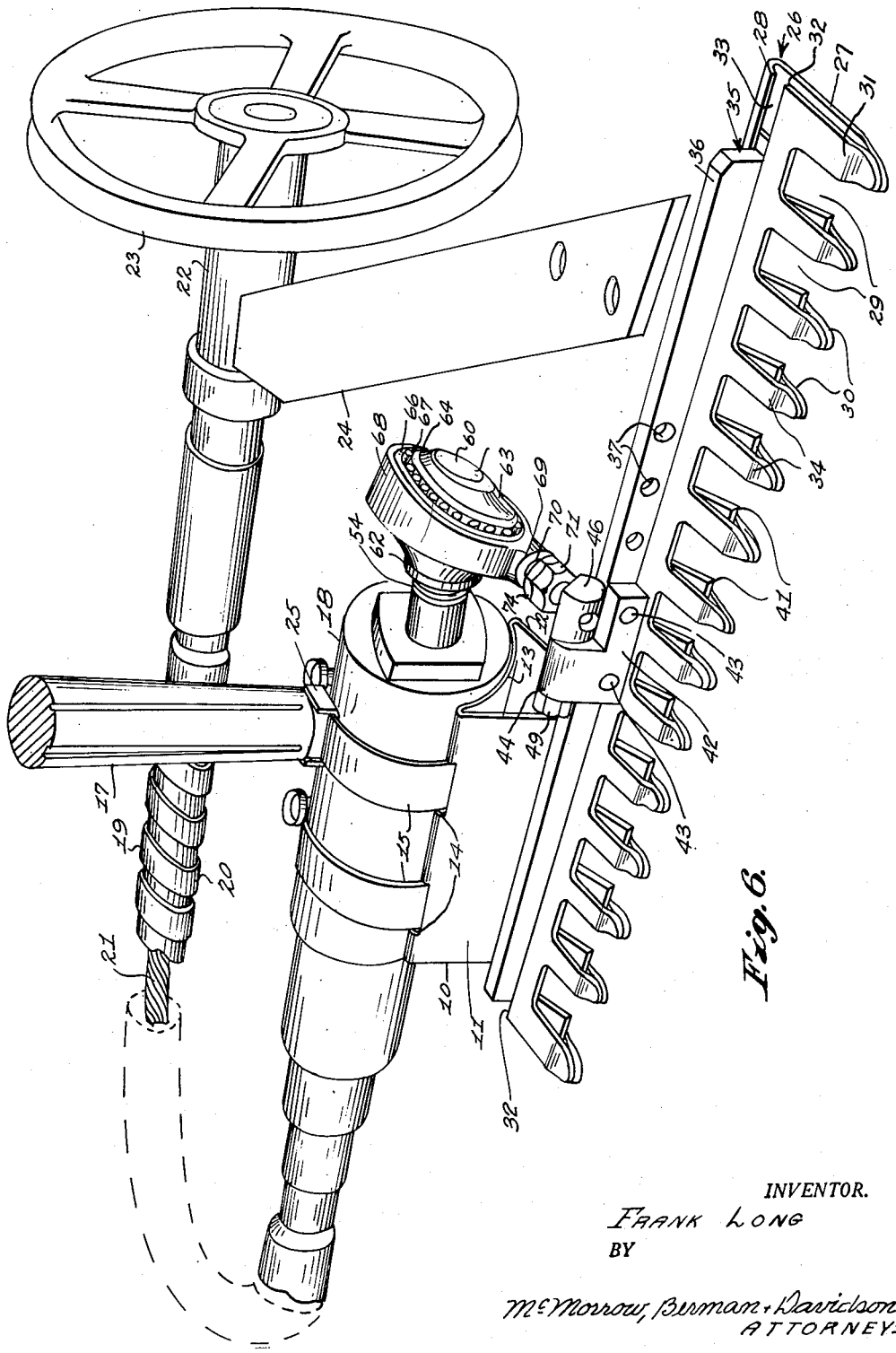
Figure 6 is a perspective view of a modified form of the assembly.

With continued reference to the drawings, the arrangement illustrated in Figure 1 shows the hedge trimmer in operative assembly with a small electric motor, such as an electric drill motor, and the arrangement illustrated in Figure 6 shows the hedge trimmer in assembly with an elongated flexible shaft the core of which may be driven by a suitable power plant, such as a garden tractor or power law mower. The hedge trimmer itself is the same in both instances, the modifications residing only in the form of the device for supplying operating power to the trimmer. The motor and the flexible drive shaft may be of well known construction and do not constitute any part of the present invention except in the combination thereof with the novel hedge trimmer unit to be driven thereby.

The hedge trimmer unit comprises an elongated mounting bracket 10 of hollow construction and preferably formed of sheet metal. This bracket has two sides 11 and 12 disposed substantially at right angles to each other and a third side 13 extending between the edges of the sides 11 and 12 remote from the juncture between these sides and made concave to receive a generally cylindrical power supplying device. The bracket 10 is provided with spaced apart slots, as indicated at 14, along each edge of the concave wall 13 and a pair of flexible straps 15 extend through these slots in spaced apart, parallel relationship to each other and extend along the inner side of the concave wall 13 of the bracket.

These straps surround the power applying device to secure such device to the bracket. In the arrangement illustrated in Figure 1 the straps 15 extend around the motor housing 16 of an electric drill motor and a handle 17 is secured at one end to one of the straps and is held by the strap in position such that it extends outwardly from the motor housing substantially perpendicular to the plane of the wall 12 of the bracket.

In the arrangement illustrated in Figure 6 an elongated cylindrical bearing structure in the form of a housing 18 is secured to the bracket 10 by the straps 15 and a flexible drive shaft 19 comprising a flexible casing 20 and a flexible core 21 rotatable in the casing extends from one end of the housing 18. At the end of the flexible drive shaft opposite the bearing housing 18 the core 21 extends through a bearing 22 and a belt pulley 23 is secured on this end of the core. A bracket 24 is secured at one end to the bearing 22 so that this end of the flexible drive shaft can be mounted on a power operated device, such as a garden tractor or power lawn mower with the belt pulley 23 in position to be driven by the engine of the tractor or mower.

The bracket 10 is the same in both cases as are also the straps 15 but, as the bearing housing 18 is smaller than the motor housing 16, the straps are drawn up to a shorter condition to attach the housing 18 than they are to attach the motor to the bracket 10. The handle 17 is secured to the corresponding strap 15 by a clip 25 through which the corresponding strap 15 extends and which is slidable along the strap to accommodate the position of the handle to the length of the strap under the different conditions indicated.

A guard structure, generally indicated at 26, is secured near one end to the wall 12 of the bracket at the juncture of the walls 11 and 12 and projects longitudinally from one end of the bracket. This guard structure comprises a lower plate 27 beaded upwardly and over along one longitudinal edge to provide a reinforcing bead 28 along the rear edge of the guard and provided along its other longitudinal edge with spaced apart notches 29 of rectangular shape to provide lower guard formations 30 between adjacent notches. The guard structure further includes a top plate 31 superimposed on the bottom plate 27 and having its rear longitudinal edge 32 spaced forwardly from the adjacent edge of the reinforcing bead 28 to provide a slot 33 extending longitudinally of the guard structure near the rear edge of the latter. The top plate 31 is also provided along its edge opposite the edge 32 with a series of spaced apart notches of rectangular shape to provide between adjacent notches upper guard formations 34. Each upper guard formation 34 is superimposed on a lower guard formation 30 and is secured at its outer end to the outer end of its corresponding lower guard formation by welding the upper and lower guard formations together at the outer ends thereof. Inwardly of the outer ends of the guard formations the top plate 31 is spaced from the bottom plate 27 to provide a space receiving a portion of the cutter blade, generally indicated at 35.

The blade 35 comprises an elongated bar 36 of rectangular cross sectional shape received along its lower edge in the slot 33 of the guard structure and provided intermediate its length with a series of spaced apart, transversely extending apertures 37. The blade further includes a flat plate 38 disposed below the lower edge of the bar 36 with the rear edge of the plate substantially flush with the rear side of the bar and this plate is secured to the bar by suitable means, such as the screws 39 extending through apertures in the plate and threaded into tapped holes opening to the lower edge of the bar. Along its other longitudinal edge the plate 38 is provided with a series of spaced apart notches 40 the inner edges of which are spaced from and substantially parallel to the adjacent side of the bar 36 and the side edges of which diverge symmetrically from the front edge of the plate toward the bar providing between adjacent notches cutter blades or sections 41 of partly triangular shape having their wider ends at the front edge of the blade and their side edges symmetrically converging from the front edge of the blade toward the bar 36.

The blades 41 are reciprocable between the lower and upper formations of the guards and the side edges of these blades are sharpened to cut material, such as hedge twigs, against the sides of the guards as the blade sections reciprocate across the spaces between adjacent guards.

A bracket 42 is disposed against the front side of the bar 36 and above the top surface of the upper guard plate 31 and is secured to the bar 36 by suitable fasteners, such as the screws 43 extending through apertures in the bracket and through selected apertures of the series of apertures 37, the screws being either threaded into the apertures 37 or having nuts threaded thereon at the rear side of the bar. A lug formation 44 extends upwardly at one end of the bracket and this lug formation is provided with a bore 45 which is disposed somewhat above and substantially parallel to the bar 36.

A connecting member 46 includes a generally semi-cylindrical portion 47 one end of which rests against one end of the lug formation 44 and a cylindrical shank 48 extending from one end of the portion 47 through the bore 45 of the lug formation and provided with external screw threads at its end remote from the portion 47. A nut 49 is threaded onto the screw threaded outer end portion of the shank 48 and a thrust washer 50 is disposed between this nut and the adjacent end of the lug formation. The shank 48 is thus secured in the lug formation 44 for rotational movement relative thereto. The flat face 51 of the semi-cylindrical portion 47 faces upwardly and rearwardly and this portion is provided with a transverse aperture 52 opening to the flat face 51 thereof and constituting a socket for the ball element 73 of a universal joint.

In the arrangement illustrated in Figure 1 the motor housing is provided with an elongated bearing structure in the form of a housing 53 extending from one end of the housing and a drive shaft 54 projects from the outer end of this boss. The drive shaft 54 is driven from the motor shaft through the usual reduction gear train, not illustrated, and a structure 55 extends from the housing 53 along the motor housing and carries at its end opposite the housing 53 a hand grip 56 and a manually operated switch 57 for controlling the operation of the motor, the extension cord 58 for the motor leading to the switch 57 through the grip 56.

The drive shaft 54 is provided with a reduced end portion 60 terminating in an annular shoulder 61 and provided with external screw threads. A washer 62 surrounds the portion 60 and bears against the shoulder 61 and a body 63 provided with an internally screw threaded bore is threaded onto the screw threaded reduced portion 60 of the drive shaft and bears against the side of the washer 62 opposite the shoulder 61. This body 60 is provided with a skewed peripheral surface 64 the axis of which is disposed at an angle of approximately 20 degrees to the axis of shaft 54.

The cylindrical inner race 65 of an antifriction bearing surrounds the surface 64 of the body 63 and is firmly secured on this surface. A cylindrical outer race 66 circumspatially surrounds the inner race 65 and antifriction elements, such as the rollers 67, are interposed between the inner and outer races.

An annular band or collar 68 surrounds the outer bearing race 66 and is secured to the latter and an apertured boss formation 69 is provided on this band. A stud 70 is secured at one end in the aperture of the boss formation 69 and projects radially from the band 68. External screw threads are provided on this stud 70 at its outer end and a nut 71 is threaded onto the screw threaded outer end of this stud. An extension 72 is provided on the outer end of the nut 71 and a ball formation 73 is provided on the outer end of the extension 72 and is received in the aperture 52 in the member 46. A lock nut 74 threaded on the stud between the boss formation 69 and the nut 71 locks the nut 71 in adjusted position on the stud.

With this arrangement, when the motor is placed in operation to drive the shaft 54, the skewed connection between the drive shaft and the annular band or collar 68 causes this band to wobble, the band being held against rotation by the connection of the stud 70 with the member 46. This wobbling movement of the band causes the ball 73 to move longitudinally of the guard structure 26 imparting a reciprocatory movement to the blade 35.

In the arrangement illustrated in Figure 6 the core 21 of the flexible shaft 19 is connected to the adjacent end of the shaft 54 which projects from the bearing housing 18. The body 63 is threaded onto the opposite end of the shaft 54 which also projects from the bearing housing 18. Otherwise, the operation of the arrangement illustrated in Figure 6 is the same as that illustrated in Figure 1 and described above.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is,

1. A hedge trimmer assembly comprising an elongated bearing structure, a drive shaft journaled in said bearing structure and projecting from one end of the latter, a bracket having a concave surface partly receiving said bearing structure and having substantially parallel edges one of which is spaced from said concave surface, means detachably securing said bearing structure to said bracket with the axis of said drive shaft substantially parallel to the edges of said bracket, a sickle bar including a guard structure secured intermediate its length to said bracket adjacent said one edge of the latter and extending along said one edge of the bracket, said guard structure having a slot extending longitudinally thereof, a blade structure reciprocable in said guard structure and including a back bar projecting through the slot in said guard structure, a lug mounted on said back bar intermediate the length of the latter, a roller bearing mounted on the end of said shaft projecting from said bearing structure and having a cylindrical bearing surface the axis of which is disposed at an angle to the rotational axis of said shaft, an outer bearing race surrounding said cylindrical bearing surface, and means providing a universal joint connection between said outer bearing race and said lug.

2. A hedge trimmer assembly comprising an elongated bearing structure, a drive shaft journaled in said bearing structure and projecting from one end of the latter, a bracket having a concave surface partly receiving said bearing structure and having substantially parallel edges one of which is spaced from said concave surface, means detachably securing said bearing structure to said bracket with the axis of said drive shaft substantially parallel to the edges of said bracket, a sickle bar including a guard structure secured intermediate its length to said bracket adjacent said one edge of the latter and extending along said one edge, said guard structure having a slot extending longitudinally thereof, a blade structure reciprocable in said guard structure and including a back bar projecting through the slot in said guard structure, a lug mounted on said back bar intermediate the length of the latter, a connecting member pivotally mounted on said lug and having a socket therein, a roller bearing mounted on the end portion of said shaft projecting from said bearing structure and having a cylindrical bearing surface the axis of which is disposed at an angle to the rotational axis of said shaft and an outer race surrounding said bearing surface and having a boss thereon, and a pin adjustably secured at one end to said boss and having on its other end a rounded head received in the socket in said connecting member and providing a universal joint connection between said outer bearing race and said lug.

References Cited in the file of this patent

UNITED STATES PATENTS

| Number | Name | Date |
| --- | --- | --- |
| 874,522 | Martin | Dec. 24, 1907 |
| 1,430,173 | Malvick | Sept. 26, 1922 |
| 1,458,250 | Staudinger | June 12, 1923 |
| 1,458,326 | Connor | June 12, 1923 |
| 1,669,420 | McArdle | May 15, 1928 |
| 2,268,221 | Mischker | Dec. 30, 1941 |
| 2,302,995 | Holmes | Nov. 24, 1942 |
| 2,335,415 | Holmes | Nov. 24, 1942 |
| 2,491,624 | Shaff | Dec. 20, 1949 |
| 2,526,428 | Skardal | Oct. 17, 1950 |
| 2,530,871 | Gossling | Nov. 21, 1950 |